H. J. CARSON.
PORTABLE ELEVATOR.
APPLICATION FILED MAR. 25, 1918.
Reissued Apr. 1, 1919.
14,622.
2 SHEETS—SHEET 1.
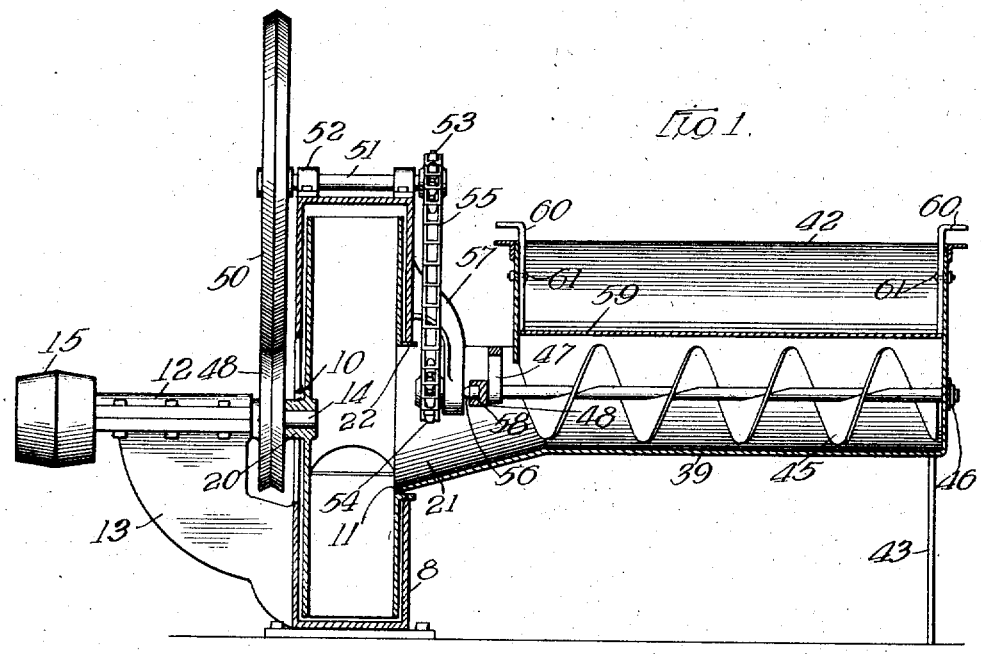
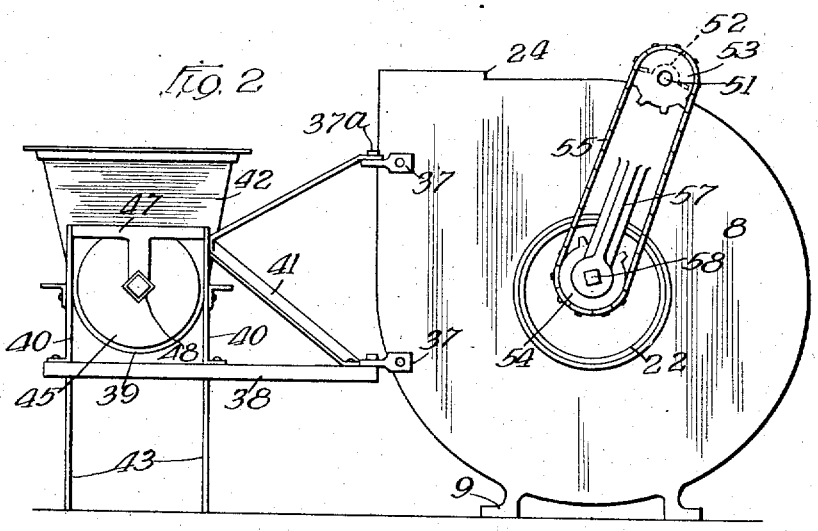
Witnesses:
Harry C. C. White
W. F. Kilroy
Inventor:
Hugh J. Carson,
By W. V. Deff
Atty
THE NORRIS PETERS CO., PHOTO-LITHO., WASHINGTON, D. C.

H. J. CARSON.
PORTABLE ELEVATOR.
APPLICATION FILED MAR. 25, 1918.
Reissued Apr. 1, 1919.
14,622.
2 SHEETS—SHEET 2.
Fig. 3.
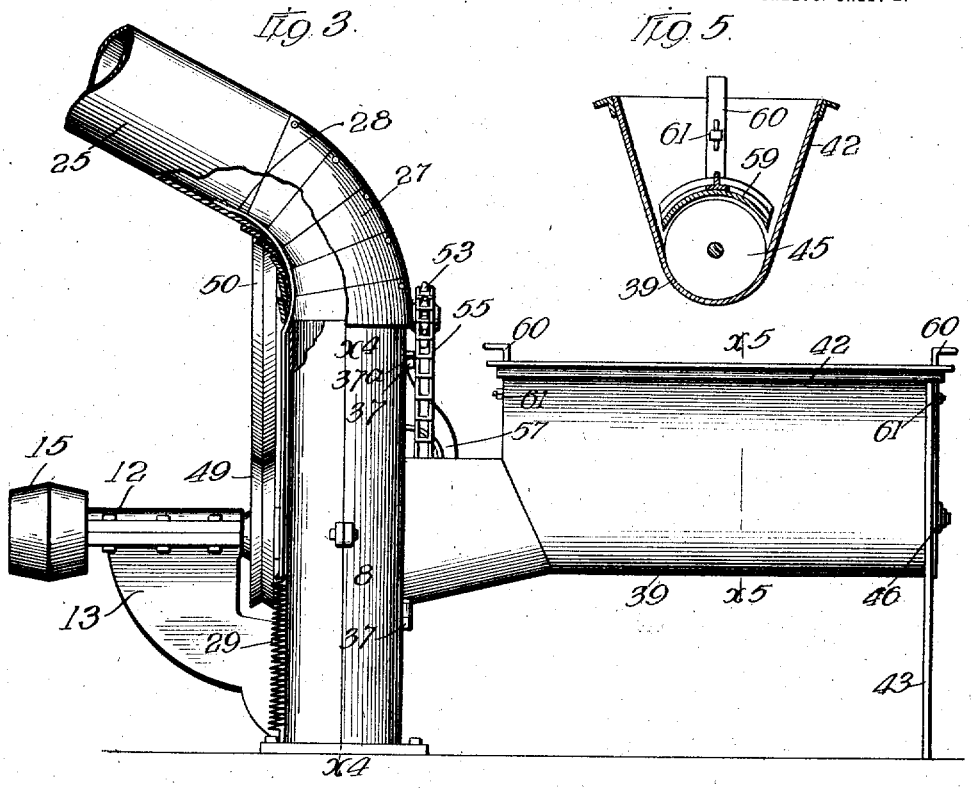
Fig. 5.
Fig. 4
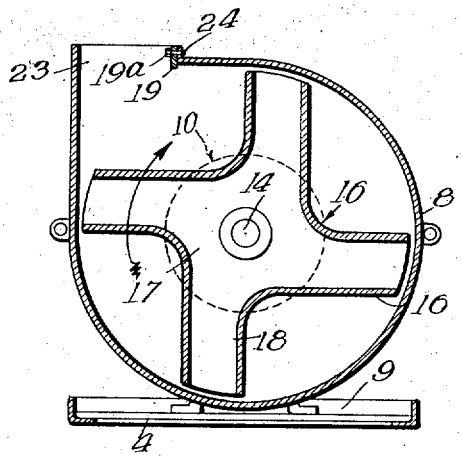
Witnesses:
Harry R. E. White
W. P. Kilroy
Inventor.
Hugh J. Carson,
By W. V. Tefft
Atty.
THE NORRIS PETERS CO., PHOTO-LITHO., WASHINGTON, D. C.

UNITED STATES PATENT OFFICE.

HUGH J. CARSON, OF FAIRFAX, MINNESOTA, ASSIGNOR TO JOHN ROCKE, OF PONTIAC, ILLINOIS.

PORTABLE ELEVATOR.

14,622. Specification of Reissued Letters Patent. Reissued Apr. 1, 1919.

Original No. 1,189,663, dated July 4, 1916, Serial No. 833,881, filed April 23, 1914. Application for reissue filed March 25, 1918. Serial No. 224,678.

*To all whom it may concern:*

Be it known that I, HUGH J. CARSON, a citizen of the United States, residing at Fairfax, in the county of Renville and State of Minnesota, have invented new and useful Improvements in Portable Elevators, of which the following is a specification.

My invention has for its object to provide a self-contained and portable grain elevator, especially adapted for use on farms, for delivering grain into granaries; and, to this end, the invention consists of the novel devices and combinations of devices hereinafter defined and described in the claims.

The particular object of my invention is to provide a combined fan and centrifugally acting device to operate with the fan casing that will cause the grain to be delivered to grain receiving portions of the fan and to the arrangement of fan and casing elements relatively to effect a back pressure within the fan casing at certain points or a certain portion of the fan casing to prevent grain from being ground between the ends of fan blades and the casing.

In its present embodiment, my invention consists in providing a fan having a central grain receiving chamber and radiating arms from said central chamber and communicating therewith through ducts or central openings therein, said fan blades being shaped to form substantially trough shape grain carrying parts and with a flat side to be presented to the air entering between the radiating fan members that will serve as fan blades; the provision of an air inlet into the casing and its relative arrangement with respect to the fan and to combinations and construction of parts hereinafter more particularly pointed out.

In the accompanying drawings, which illustrate the invention, like characters indicate like parts throughout the several views.

Referring to the drawings:—Figure 1 is a view principally in longitudinal vertical section taken centrally through the invention; Fig. 2 is an end elevation with the feed spout swung into an inoperative position; Fig. 3 is a side elevation of the parts shown in Fig. 1, with some parts broken away and with some of the exposed parts shown in section; Fig. 4 is a vertical section taken on the line $x^4$ $x^4$ of Fig. 3; Fig. 5 is a detailed view in vertical section on the line $x^5$ $x^5$ of Fig. 3.

The numeral 4 indicates a supporting base on which is mounted a fan casing 8, as shown, preferably composed of two upright sections detachably secured one to the other, and having formed therein axially eyes 10 and 11. Each section of said casing is provided with a supporting foot 9 rigidly secured to the supporting base 4. A two-part horizontally extended bearing sleeve 12, axially alined with the eyes 10 and 11, is secured to the lower section of the fan casing 8 by a bracket 13, integrally formed therewith on the same side as the eye 10. Intermediately journaled in the bearing sleeve 12 is a shaft 14, the inner end of which extends through the eye 10 into the fan casing 8, and the other end of which has rigidly secured thereto a driving pulley 15.

A centrifugal fan 16, of novel construction, is mounted within the fan casing 8 and is formed with a common central chamber 17 and a plurality of radial hollow blades 18 leading from said chamber, the said hollow blades 18 having flat driving faces. In the present embodiment of the invention, the purpose of this construction is the provision of a means adapted to rotate in unison with the hollow blades, which act as centrifugal discharge spouts, for creating a strong compression of air in the spaces between said blades and a consequent back pressure at approximately the peripheral wall of the casing sufficient to keep the grain in the hollow blades until they respectively deliver the same to the point of discharge and thereby to prevent grinding of the grain against the peripheral wall of the casing. The side of the fan chamber 16, adjacent to the eye 10, has integrally formed therewith a horizontally extended hub 20 keyed to the inner end of the shaft 14. The other side of the fan chamber 17 is provided with an eye or an air and grain intake 21, surrounded by a laterally projecting flange 22, which extends through and works within the eye 11 of the fan casing 8.

Preferably, a gas engine is employed for driving the fan 16, in which case a belt will be arranged to run over a pulley on the engine shaft and over the pulley 15, but, for the purpose of this case, it is not thought necessary to illustrate either the gas engine or the belt.

In the top of the fan casing 8 is formed a grain discharge opening 23 surrounded by an upwardly extended collar 24. Within this opening is mounted a cut-off blade 19, provided for preventing the air and grain from passing between the ends of the fan blades 18 and the casing, after said blades have passed the opening 23. This cut-off blade 19 is held in different vertical adjustment by a set bolt 19[a], in order that the same may be adjusted from time to time, to take up wear on the ends of the fan blades. A discharge grain spout 25, preferably made in two sections, detachably connected at 26 by a bayonet joint or other suitable means, not shown, is, at its lower end, connected to the casing 8 by a flexible joint 27. This joint is made up of pivotally connected members of well-known construction, the lower of which is telescoped onto the collar 24. The members of the flexible joint 27 are preferably made rectangular in cross section, and the lower sides thereof are covered by a flexible metal plate 28, rigidly secured, at its upper end, to the lower portion of the flexible joint 27, and having its lower end, passed between the collar 24 and the flexible joint 27. The plate 28 is yieldingly held in engagement with the joint 27 by a long coiled spring 29, anchored to said plate, and to the supporting base 4. Obviously, this spring will permit the plate 28 to move during the adjustment of the joint 27. Any suitable means, not shown, may be provided for supporting the upper end of the discharge spout 25.

A pair of alined vertically spaced hinge lugs 37 are integrally formed with the section of the fan casing 8 having the eye 11. One end of a supporting arm 38 is pivoted to the lower hinge lug 37 for horizontal swinging movement. The inner end of a horizontally extended feed spout 39 is supported on the arm 38, by a pair of legs 40, for horizontal swinging movement therewith. A V-shaped brace rod is provided for holding the arm 38 from sagging. The upper end of this rod 41 is pivoted, at 42, to the upper hinge lug 37, and the lower end thereof is rigidly secured to the arm 38. At its intermediate portion, the rod 41 is rigidly secured to the upper end of the inner leg 40. On the outer end portion of the feed spout 39 is a longitudinally extended open bottom hopper 42 arranged to discharge into the said feed spout and a ground-engaging leg 43. As shown in Fig. 1, the feed spout 39 is supported by the leg 43 in a position to permit the hopper 42 to swing under the rear end of the wagon box, and into a position to receive the grain dumped or shoveled from said wagon box, after the end gate thereof has been removed or opened.

The grain delivered into the spout 39 is carried to the fan 16 by a spiral conveyer 45, mounted in the feed spout 39, with one end of its shaft journaled in a bearing 46 on the outer end of said spout, and in a bearing bracket 47 suspended within the inner end portion of said spout. On the inner end of the conveyer shaft is a head 48 having a rectangular socket, the purpose of which will presently appear.

The conveyer 45 is driven from the shaft 14 by the following connections, to wit:—Keyed to the shaft 14 is a relatively small grooved friction wheel 49, which meshes with a relatively large beveled friction wheel 50, keyed to one end of a counter-shaft 51 journaled in bearings 52 on the fan casing 8. To the other end of the counter shaft 51 is keyed a sprocket wheel 53, over which sprocket wheel and an alined sprocket wheel 54 runs a sprocket chain 55. The sprocket wheel 54 is keyed to a short shaft 56, alined with the shaft of the conveyer 45, and journaled on a bearing bracket 57 integrally formed with the fan casing 8. On the end of the shaft 56, adjacent to the conveyer 45, is a rectangular head 58 adapted to fit within the socket of the head 48 when the conveyer spout 39 is swung into an operative position, and thereby lock the conveyer and shaft 56 for common rotary movement. Obviously, when the spout 39 is swung into an inoperative position, the driving connection between the shaft of the conveyer 45 and the shaft 56 is broken, by the separation of the interlocking heads 48 and 58.

To regulate the flow of grain from the hopper 42 to the conveyer 45, is mounted within the said hopper, and overlying the said conveyer, a segmental hood 59 having at each end, an upwardly projecting slotted arm 60. These arms are secured in different vertical positions to the hopper 42 by clamping bolts 61 passed through the slots in said arms. Obviously, by raising or lowering the hood 59, the space between the longitudinal edges thereof and the sides of the hopper 42 may be varied; and said hood and hopper coöperate to afford a feed regulator, to determine the amount of grain to be fed to the conveyer 45 from said hopper. The upper ends of the arms 60 are, as shown, bent laterally outward to afford hand pieces by which the hood 59 may be raised or lowered within the hopper.

The form of the fan 16 and its relation to the fan casing 8 is of material importance. The fan is formed with the central clearance or open space to provide for receiving grain at its central portion and delivering it through centrifugal action through the radial hollow blades 18 and is so related with respect to width of the fan body and the reach of the fan blades to the fan casing as to effect substantially a complete closure or close revolving fit therein, except for a small space between the ends of the fan blades which are carrying grain and the outer or peripheral wall of the casing. Also, the opening 10 at the sides of the casing are arranged relative to the fan and particularly to the fan blades so as to provide a comparatively small inlet for air into the spaces between the fan blades, thus serving to create, when the fan is revolved rapidly, a strong suction to and through such opening. With the relative arrangement of parts including the casing, fan and air inlet openings, only a small amount of air enters the interior of the fan and a comparatively large amount of air enters between the fan blades. Also, the effect of making or providing a substantial closure between the side walls of the casing and but small clearance at the end of the fan blades is to cause a back pressure in the hollow portions of such blades, which serves to hold the grain back and prevent its being ground or cracked between the ends of the fan blades and the outer circumferential wall of the casing. By this means grain can be handled in this combined fan and centrifugally acting device without being damaged by cracking or grinding.

The operation of the device may be briefly stated as follows:—When the device is not in use, the feed spout 39 is swung to one side on the arm 38, so that a wagon may be driven close to the supporting base 4. The feed spout 39 is then swung into an operative position with the hopper 42 slightly under the rear end portion of the wagon box, in a position to receive the grain as the same is shoveled or dumped from said wagon. The fan is now started and, when the same has reached the required speed, the end gate of the wagon is opened and the grain allowed to flow into the hopper 42, and directly onto the hood 59, and is fed therebetween and the upwardly diverging sides of the hopper 42 into the feed spout 39. Obviously, by vertically adjusting the hood 59, the amount of grain fed to the conveyer 45 may be varied at will. From the spout 39, the grain is moved by the conveyer 45 to the delivery end of the spout, from where it is discharged by gravity into the central chamber 17 of said fan 16 through the port 21, where it is caught by the hollow blades 18 and thrown through the opening 23 into the discharge spout 25. From thence, the grain thrown from one blade 18 will be blown, by the force of the air from the fan of the next following blade 18, through the spout 25. Air for the fan is drawn through the eye 10 to the spaces between the fan blades. By the proper adjustment of the delivery spout 25, the grain may be deposited in the granary where desired.

What I claim is:

1. In a device of the kind described, the combination with a fan casing provided with a discharge spout of a fan journaled, at one side, to one side of said casing, means for driving said fan, the said fan having a common central chamber and radial tubular blades leading from said chamber, the said tubular blades having flat driving faces, a cut-off blade mounted on said casing for cooperation with said fan blades after they have passed said discharge spout, said casing and fan having coincident eyes, and a feed spout arranged to deliver through said eyes.

2. In a device of the kind described, the combination with a fan casing provided with a discharge spout, of a fan journaled, at one side, to one side of said casing, means for driving said fan, the said fan having a common central chamber, and radial tubular blades leading from said chamber, the said tubular blades having flat driving faces, an adjustable cut-off blade mounted on said casing for coöperation with said fan blades after they have passed said discharge spout, said casing and fan having coincident eyes, and a feed spout arranged to deliver through said eyes.

3. In an elevator, in combination, a fan casing provided with a grain inlet at its central portion, and with an air inlet and a discharge pipe, a fan journaled in the casing formed with a central chamber for receiving grain and with hollow fan blades having one side substantially flat for the purpose of acting as a fan blade, said blades extending to approximately the periphery of the fan casing and formed at their ends for substantial coincidence with said fan casing to provide a substantial closure of the ends thereof by said fan casing, the casing and the fan being so related as to create a strong compression of air between the fan blades when the fan is rapidly rotated, means for rotating the fan and means for delivering grain to the central opening in the fan.

4. In an elevator, in combination, a fan casing provided with a grain inlet at its central portion, and with an air inlet and a discharge pipe, a fan journaled in the casing, formed with a central chamber for receiving grain and with hollow fan blades of substantially arcuate shape in cross section and having one side substantially flat for the purpose of acting as a fan blade, said blades extending to approximately the periphery of the fan casing and formed at their ends for substantial coincidence with said fan casing to provide a substantial closure of the ends thereof by said fan casing, the casing and the fan being so related as to create a strong compression of air between the fan blades when the fan is rapidly rotated, means for rotating the fan and means for delivering grain to the central opening in the fan.

5. In an elevator, in combination, a fan casing having substantially vertical side walls and provided with an opening therein and a circularly formed peripheral closure wall with a discharge opening therein, a fan journaled therein formed with a central open chamber for receiving grain and with hollow fan blades of substantially arcuate shape in cross section and having one side substantially flat for the purpose of acting as a fan blade, said fan blades extending approximately to the periphery of the fan casing and formed at their ends for coincidence with said fan casing to provide substantial closure of the ends thereof by said fan casing, except for clearance sufficient to permit air between the fan blades to exert back pressure in the openings in said blades, the spaces between the fan blades and the air inlet being so related as to create a strong suction to and compression within the spaces between the fan blades when the fan is rapidly rotated, means for rotating the fan and means for delivering grain to the central opening in the fan.

6. In an elevator, in combination, a substantially circular fan casing having vertical side members and provided with a grain inlet opening at approximately the axial center of one of said side members and a discharge opening in the peripheral member thereof and an air inlet opening to spaces between fan blade members, a combined fan and centrifugal discharge member rotatably disposed within the casing of form and size commensurate substantially with the interior area of the casing, comprising a central open hub portion having capacity to receive quantities of grain and having a grain inlet at one side, hollow arms spaced at intervals about the hub member and communicating therewith, said arms being of arcuate shape in cross section and having a flat closure side serving as a fan blade and means to effect air compression between the fan arms in excess of pressure within the fan arms, serving to hold the grain in said arms from being ground or cracked between the ends of the fan arms and the casing.

7. In an elevator, in combination, a substantially circular fan casing having vertical side members and provided with a grain inlet opening at approximately the axial center of one of said side members and a discharge opening in the peripheral member thereof, an air inlet opening, a combined fan and centrifugal discharge member rotatably disposed within the casing of form and size commensurate substantially with the interior area of the casing, comprising a central open hub portion having capacity to receive quantities of grain and having an inlet at one side registering with the inlet opening into the casing, hollow arms spaced at intervals about the hub member and communicating therewith, said arms being of arcuate shape in cross section and having a flat closure side serving as a fan blade and means, consisting in relative proportioning, sizing and relating of casing and combined fan and centrifugal discharge member to effect air compression between the fan arms in excess of pressure within the fan arms serving to hold the grain in said arms from being ground or cracked between the ends of the fan arms and the casing.

8. In an elevator, in combination, a substantially circular fan casing having vertical side members and provided with a grain inlet opening at approximately the axial center of one of said side members and a discharge opening in the peripheral member thereof, an air inlet opening spaced from its axial center, combined fan and centrifugal discharge member rotatably disposed within the casing of form and size commensurate substantially with the interior area of the casing comprising a central open hub portion having capacity to receive quantities of grain and having an inlet at one side registering with the inlet opening into the casing, hollow arms spaced at intervals about the hub member and communicating therewith, said arms being of arcuate shape in cross section and having a flat closure side, serving as a fan blade and means consisting in relative proportioning, sizing and relating of casing and combined fan and centrifugal discharge member to effect air compression between the fan arms in excess of pressure within the fan arms serving to hold the grain in said arms from being ground or cracked between the ends of the fan arms and the casing, means for rotating the combined fan and centrifugal member and means for discharging grain into the hub portion thereof.

9. In an elevator, in combination, a casing having a grain inlet and air inlet, a discharge spout connected therewith, a combined fan and centrifugal member in the casing, comprising a central open hub part, open at one side in register with the grain inlet opening in the casing, and hollow radiating arms or blades spaced the width of the casing and extending to its periphery except for slight clearance, with the space between the blades communicating with the air inlet, means for delivering grain to the hub portion of the fan and means for driving the fan.

10. In an elevator, in combination, a casing having a grain inlet and air inlet respectively on opposite sides of the casing, a discharge spout connected therewith, a combined fan and centrifugal member in the casing, comprising a central hollow hub part, open at one side in register with the grain inlet opening in the casing, and communicating hollow radiating arms or blades spaced the width of the casing and extending to its periphery except for slight clearance, with the spaces between the blades communicating with the air inlet, means for delivering grain to the hub portion of the fan and means for driving the fan.

11. In an elevator, in combination, a combined fan and centrifugal member comprehending in its structure a grain receiving chamber spaced about its axial center and being closed on one side and open for the entrance of grain on its opposite side, radially disposed hollow members formed and shaped to serve both as fan and conduit members and arranged in offset relation to the axial center of the structure, a fan casing for housing the combined fan and centrifugal member in close fit relation, provided with entrance facility for grain to the central chamber and air to the spaces between the hollow members and also with a peripheral discharge opening, and means for driving the combined fan and centrifugal member.

12. In an elevator, in combination, a combined fan and centrifugal member comprehending in its structure a grain receiving chamber spaced about its axial center and provided with an inlet for grain, radially disposed hollow members serving both as fans and conduit members, a fan casing for housing the combined fan and centrifugal member in substantially close fit relation to facilitate back pressure in the hollow conduit members when the fan is operated, said casing being provided with inlet facility for grain to the central chamber and for air to the spaces between the radial fan members and with a peripheral discharge or outlet opening, and means for driving the fan.

13. In an elevator, in combination, a combined fan and centrifugal member comprising a central hollow hub part open at one side and radially disposed hollow members disposed in staggered relation to its axial center, a casing for housing the fan and centrifugal member in substantially close fit relation to facilitate fan action to induce back pressure in the hollow members provided with entrance way for grain to the central hub portion and for air to the spaces between the hollow members and with a peripheral discharge opening, and means for driving the fan.

14. In an elevator, in combination, a combined fan and centrifugal member, a casing for housing said combined fan and centrifugal member in substantially close fit relation and provided with inlet facility for grain and air respectively, the grain to be subjected to centrifugal action of the member and the air to be expelled by the fan to facilitate elevation of grain and with a discharge opening in the periphery of the casing, a cut off member mounted on said casing adjacent the discharge opening for cooperation with said fan members after they have passed the discharge opening for taking up any lost space or wear between the casing and the fan blades, and means for driving the fan.

15. In an elevator, in combination, a combined fan and centrifugal member comprehending in its structure a grain receiving chamber spaced about its axial center and provided with an inlet for grain, radially disposed hollow members, said members being trough shaped in cross section and arranged relative to the axial center of the hub with the bottom portion of the said members on a line therewith, serving both as fans and conduit members, a fan casing for housing the combined fan and centrifugal member in substantially close fit relation to facilitate back pressure in the hollow conduit members when the fan is operated, said casing being provided with inlet facility for grain to the central chamber and for air to the spaces between the radial fan members and with a peripheral discharge or outlet opening, and means for driving the fan.

16. In an elevator, in combination, a combined fan and centrifugal member comprehending in its structure a grain receiving chamber spaced about its axial center and provided with an inlet for grain, radially disposed hollow members, the carrying surface of each being alined with the axial center of the hub member, a fan casing for housing the combined fan and centrifugal member in substantially close fit relation to facilitate back pressure in the hollow conduit members when the fan is operated, said casing being provided with inlet facility for grain to the central chamber and for air to the spaces between the radial fan members and with a peripheral discharge or outlet opening, and means for driving the fan.

17. In a device of the character described, the combination with a casing having a peripheral wall and side walls, of a rotary material-receiving chamber within the casing having an inlet and provided with a plurality of communicating discharge members for material, respectively extending approximately to the peripheral casing wall, except for clearance sufficient to permit rotation within said casing, an outlet communicating with said casing, and means operative during rotation of said chamber for creating back pressure adjacent the peripheral casing wall in excess of the pressure on the material within said discharge members, to prevent contact of said material with the peripheral casing wall.

18. In a device of the character described, the combination with a casing having a peripheral wall and side walls of a rotary material-receiving chamber within the casing having an inlet and provided with a plurality of communicating discharge members for material, respectively extending approximately to the peripheral casing wall, except for clearance sufficient to permit rotation within said casing, an outlet communicating with said casing, and means adapted to rotate in unison with said chamber and discharge members for creating back pressure adjacent the peripheral casing wall in excess of the pressure on the material within said discharge members, to prevent contact of said material with the peripheral casing wall.

19. In a device of the character described, the combination with a casing having a peripheral wall and side walls, of a rotary material-receiving chamber within the casing having an inlet and provided with a plurality of communicating discharge members for material, respectively extending approximately to the peripheral casing wall, except for clearance sufficient to permit rotation within said casing, an air inlet communicating with the spaces between said discharge members, an outlet communicating with said casing, and means operative during rotation of the chamber and discharge members for creating a compression of air between said discharge members in excess of the pressure on the material within said members.

In testimony whereof, I affix my signature in the presence of two witnesses.

HUGH J. CARSON.

Witnesses:
JOHN ROCKE,
W. V. TEFFT.

Copies of this patent may be obtained for five cents each, by addressing the "Commissioner of Patents, Washington, D. C."